(12) United States Patent
Raun et al.

(10) Patent No.: US 6,394,394 B1
(45) Date of Patent: May 28, 2002

(54) PAYLOAD FAIRING WITH JETTISONABLE MASS ACOUSTIC SUPPRESSION

(75) Inventors: Richard L. Raun, Lindon; Patrick R. Oyler, Sandy; Bruce D. Hopkins, Salt Lake City, all of UT (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

(21) Appl. No.: 09/567,816

(22) Filed: May 9, 2000

(51) Int. Cl.[7] ................................................ B64G 1/10
(52) U.S. Cl. .................... 244/158 R; 244/1 N; 244/121
(58) Field of Search ............................. 244/158 R, 163, 244/1 R, 1 N, 133, 117 R, 119, 121; 428/116, 117; 181/290–292, 286

(56) References Cited

U.S. PATENT DOCUMENTS

| | | | | |
|---|---|---|---|---|
| 4,035,535 A | * | 7/1977 | Taylor | 181/206 |
| 5,310,592 A | * | 5/1994 | Baker et al. | 244/158 A |
| 5,330,124 A | * | 7/1994 | Le Touche | 244/158 A |
| 5,445,861 A | | 8/1995 | Newton et al. | 428/116 |
| 5,670,758 A | * | 9/1997 | Borchers et al. | 181/292 |
| 5,776,579 A | * | 7/1998 | Jessup et al. | 181/292 |
| 6,224,020 B1 | * | 5/2001 | Hopkins et al. | 244/158 R |

* cited by examiner

Primary Examiner—Galen L. Barefoot
(74) Attorney, Agent, or Firm—Vidas, Arrett & Steinkraus. P.A.

(57) ABSTRACT

A fairing for protecting a payload from excessive acoustic energy is disclosed. The fairing can be used with a launch vehicle for launching payloads such as satellites or the like. The invention provides structure to surround a payload and absorbs acoustic energy so that the noise is suppressed to acceptable levels and the payload is not damaged. The fairing comprises a two dimensional honeycomb core having composite face sheets and load skins bonded to each side of the core. A water barrier is connected to the inner side of the fairing to prevent moisture from entering the payload area. The fairing wall further includes a liquid which is added to the two dimensional honeycomb layer. The liquid is jettisoned during the launch of the vehicle at a predetermined time when the additional acoustic suppression provided by the mass of liquid is no longer needed. The fairing may also include an energy absorbing blanket connected to the inner side of the fairing to further suppress the energy generated by a launch vehicle.

44 Claims, 5 Drawing Sheets

PAYLOAD FAIRING WITH JETTISONABLE MASS ACOUSTIC SUPPRESSION

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

This invention relates to the field of payload fairings for launch vehicles and more particularly, to an improved payload fairing utilizing a jettisonable mass to provide improved acoustic suppression characteristics.

It is known that launch vehicles of payloads such as satellites require measures to protect the payload from the sound fields generated by lift-off and flight. It is also known that as new higher energy launch vehicles are utilized the increased total lift-off thrust of these vehicles produces higher acoustic field intensities than current launchers. Therefore, conventional measures for protection of payload are inadequate.

A fairing is the shroud or cover that surrounds the payload or cargo which will be launched for use. Generally, the cargo is a satellite although any other instrument or vehicle may be launched. The fairing protects the payload from the atmosphere. When the launch vehicle is above atmosphere the fairing is jettisoned. The payload is released when the propulsion operations are completed. Currently, fairings are generally constructed with a solid metal wall or a layered wall including a standard hexagonal cell aluminum honeycomb core with composite face sheets. These "bare wall" fairings do not adequately protect some payloads from damage. The robustness of the payload varies. Some payloads are more fragile and sensitive than others. These payloads require more protection.

The payload must be protected from the high temperatures, large forces, and vibrations due to noise encountered during launch. The acoustic energy produced can damage the payload. The acoustic energy can reach 150 dB which produces vibrations that can lead to mechanical damage. In the case of satellites, antennas or other appendages can break. Circuit boards can be damaged and mirrors or lenses can be damaged or moved out of alignment. Any resulting damage can seriously degrade or totally impair the capabilities of space launched equipment.

Acoustic blankets have been used to absorb the acoustic energy to protect the payload. The blankets are attached to the inside surface of the fairing wall. These blankets are usually made of fiberglass batting or a combination of fiberglass sheets and batting which are of different thicknesses and are layered together. The use of blankets has been found to be most effective at frequencies above 300 Hz but does not provide enough protection below about 100 Hz. For frequencies of greater than 300 Hz, the wavelengths are fairly short and the acoustic energy can be fairly easily absorbed by the blankets. However, for frequencies below 100 Hz, the wavelengths are fairly long and there is not a sufficient depth of material in blankets to absorb a significant portion of the energy. Therefore, the blankets are not very effective at these frequencies. In the past, to increase effectiveness of the blankets the thickness has been increased to provide more absorption. As the thickness of the blankets is increased, the cost, volume, and weight of the blanket is increased. Of course, an increase in weight and volume of the blanket decreases the weight and volume available for payload. Thus, the launch vehicle payload lift capability is adversely affected by use of thick, heavy blankets.

Two other approaches to reducing acoustic transmission through the fairing wall have been taken. The stiffness of the wall has been increased and the mass per unit area of the wall has been increased. Neither of these approaches are considered desirable because they usually increase fairing weight, which reduces payload weight delivered to orbit.

Consequently, a need remains for a payload fairing which can suppress the acoustic energy generated by the launch of the payload to protect the payload without penalizing vehicle lift capability. The invention provides high acoustic attenuation over a wide frequency band including low frequencies.

BRIEF SUMMARY OF THE INVENTION

The invention is a payload fairing including a number of layers of material that surround the payload and also act as an acoustic damper to protect the payload from excess acoustic energy generated during lift off and launch.

The payload fairing or shroud comprises a wall for forming the fairing structure including face sheets typically fiber-resin, bonded to each side of a porous layer or core, typically two-dimensional aluminum honeycomb. The fiber-resin face sheets form an inner and outer skin. A water barrier is included as part of the inner skin. The honeycomb material is a two-dimensional honeycomb and is generally aluminum. Each of the inner and outer skins comprises carbon-epoxy face cloth or weave and carbon-epoxy tape or load skin. The inner and outer skins are the structural layers which provide strength to the fairing wall. The modified honeycomb layer is filled with a liquid which is held in place by the inner and outer skins. The shroud includes drain ports which are opened at a predetermined time during vehicle launch and the liquid is drained out of the shroud.

One advantage of the invention is that it provides high acoustic attenuation over a wide frequency band. As stated above, for frequencies above 300 Hz the wavelengths are fairly short and are more easily absorbed and for frequencies below 300 Hz the wavelengths are longer and the usual depth of blanketing material does not provide adequate protection. However, with the present invention the construction and materials of the fairing provide improved damping capabilities even at frequencies below 300 Hz. The liquid mass and the damping provided by the two dimensional honeycomb core in the fairing wall allows for better dissipation of the acoustic energy.

Another advantage of the invention is that there is little impact on the payload lifting capability of the launch vehicle. The mass added by the liquid suppression layer is jettisoned as early as possible in flight. The rapid draining of the liquid decreases the total vehicle weight early in the flight. Therefore, the invention utilizes the liquid suppression layer when noise levels are at the highest to provide the added damping protection needed for today's launch requirements but the liquid is not carried through the entire launch so that vehicle lifting capability is not significantly affected.

Yet another advantage of the invention is that the cost and manufacture of the inventive fairing is reasonable. The invention provides a reasonably priced practical approach to protecting payloads from high acoustic levels.

These and other advantages and features which characterize the invention are pointed out with particularity in the claims annexed hereto and which form a further part hereof. However, for a better understanding of the invention, its advantages and objects obtained by its use, reference should be made to the drawings which form a further part hereof, and the accompanying detailed description in which there is shown and described an illustrative embodiment of the invention.

BRIEF DESCRIPTION OF THE SEVERAL VIEWS OF THE DRAWINGS

Referring to the drawings, wherein like numerals represent like parts throughout the several views.

DETAILED DESCRIPTION OF THE INVENTION

Figure 1:
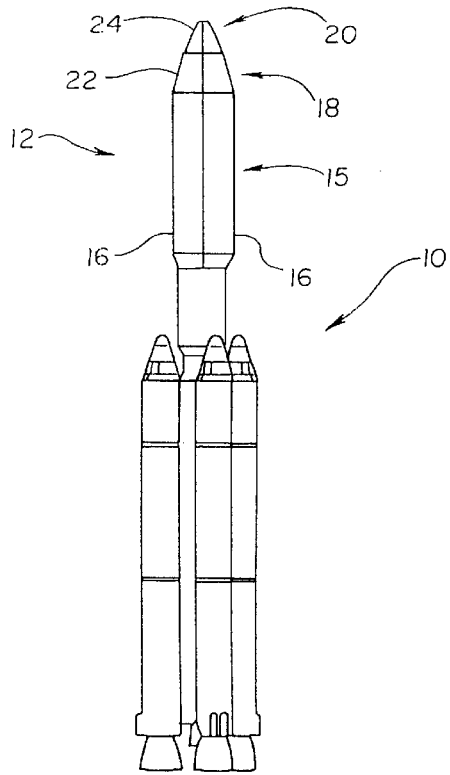
FIG. 1 is a perspective view of a launch vehicle with a payload fairing of the invention.
Figure 2:
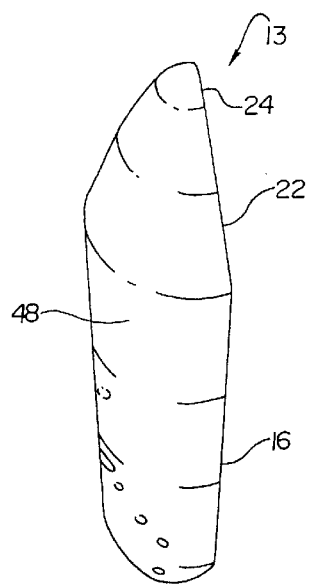
FIG. 2 is a perspective view of the outer side of a section of a payload fairing of the invention.

Referring to FIG. 1, a launch vehicle 10 is shown which includes a fairing or shroud 12. The shroud 12 surrounds a payload 14 (not shown) which is generally a satellite or other space vehicle. It should be understood that any suitable payload may be launched and that any type of launch vehicle may be utilized in the launch. The fairing 12 generally includes three portions: a base or generally cylindrical portion 15, a nose cone portion 18 and a nose cap portion 20. The fairing is made up of sectors 13 which are connected by conventional means to form the fairing. One of the sectors 13 is shown in FIG. 2. The fairing or shroud 12 surrounds the payload to protect it before and during launch. The fairing wall includes a core material which is filled with a liquid. The liquid is drained from the fairing wall at a desired predetermined time in the launch. The fairing surrounds the payload until a second predetermined point in the launch sequence. The second predetermined point may be that sufficient altitude has been achieved, for example. At that second predetermined point, the fairing 12 is discarded or deployed and the sectors 13 are forced to separate and fall away from the payload 14.

The payload needs protection from the effects of the atmosphere created at launch. The high temperatures and pressures created by aerodynamic forces can damage the sensitive payload. Further, the payload must be protected from the acoustic energy produced during launch. Antennas or other appendages could be easily damaged from the great vibrations which develop in the launch environment. Frequencies during liftoff can range from 5 Hz to 10,000 Hz or greater. The noise amplitude associated with these frequencies can reach 150 dB or greater. It is generally desired not to exceed noise levels of 125 dB to adequately protect the payload. It is known that the worst environment for the payload is created approximately five seconds into the launch. At this point noise levels may exceed 150 dB. After this point the noise drops until the vehicle enters the transonic flight regime where high frequencies affect the shroud locally and can cause damage to the payload. Therefore, the inventive fairing is constructed to dampen the acoustic energy produced during both launch and transonic flight to acceptable levels.

The inventive fairing utilizes a liquid noise suppression layer held within a porous material with connected porosity, typically a two dimensional honeycomb material, to dampen acoustic energy. The addition of mass to the core material of the fairing suppresses the noise levels to protect the payload. The liquid mass layer is expended overboard after the peak lift-off acoustical environment has past. This peak is estimated to be approximately five seconds after first stage ignition. Once the peak has been reached the liquid is rapidly drained from the fairing to decrease the total weight as early as possible in flight. The point of draining of the liquid is predetermined and based on the acoustic levels during flight. The drain ports or apertures are opened at the predetermined time and the liquid is quickly drained. The drain passages may be opened during or after the liftoff process is complete. The drain event is triggered remotely by appropriate means.

As stated above, the fairing 12 is made up of a number of sectors 13. In a preferred embodiment, the fairing 12 is comprised of three sectors 13. Generally, two or three sectors are utilized but it should be understood that any number of sectors may be used as desired. The individual sectors 13 are connected to form the protective housing for the payload. Each sector 13 is made up of subsections. In the preferred embodiment, the subsections include sections of the cylindrical, nose cone and nose cap portions described above. The cylindrical portion 15 is made up of sections 16, the nose cone portion 18 is made up of sections 22 and the nose cap portion 20 is made up of sections 24. Therefore, sector 13 is formed to include section 16, section 22 and section 24 as shown in FIG. 2.

The sectors 13 are connected to each other to form the shroud 12 by conventional means. In the preferred embodiment, the connection is made by using an energetic separation joint common to spacecraft fairing structures. The separation joint hardware is typically bonded and mechanically attached to the fairing sector edges as is known to those skilled in the art. The connections are then sealed to provide a secure arrangement until the shroud is to be deployed away from the payload. In one embodiment, compressed gas or explosive devices are used with the connectors so that when desired the compressed gas or explosion separates the sectors 13 from one another and away from the payload. In the preferred embodiment, explosive devices are detonated remotely when the vehicle reaches a predetermined altitude and the sectors fall away from the payload. The payload is then exposed. One type of separation device which may be used is explosive rails (not shown). One type of explosive rail is the SUPERZIP rail made by Boeing Co. Of course, any appropriate connection device or method and any appropriate separation device or method may be utilized with the invention.

The fairing walls may be constructed in a number of ways. In the preferred embodiment all the fairing walls are constructed at the same time. The fairing wall is then cut into the desired number of sectors. The sectors may then be connected to form the fairing which is attached to the launch vehicle. It is also possible to construct each sector individually. Whether all sectors are constructed at once or individually, they are generally made complete from base to nose cap. In this manner, there is no need to connect the base or cylindrical portion to the nose cone portion and then connect the nose cone portion to the nose cap portion. However, it should be understood that it is also possible to make all or some of the portions separately and connect them by proper attachment means to construct the shroud.

In the preferred embodiment, the core of each of the sections 16, 22 and 24 is preformed to the required curvature and shape. It should be understood that the requirements for curvature and shape are determined by the launch vehicle. The inner surface skin of the fairing is fiber placed on a mandrel (not shown). Then the core material is installed over the inner skin. The outer skin of the fairing is fiber placed on the outer surface of the core. The inner skin and the outer skin of the fairing may include a number of layers. The inner skin may include a water barrier. The layers and the core will be discussed in further detail below. The structure is then cured to provide a strong structural wall which is used to form a fairing for attachment to and use with a launch vehicle.

Figure 3:
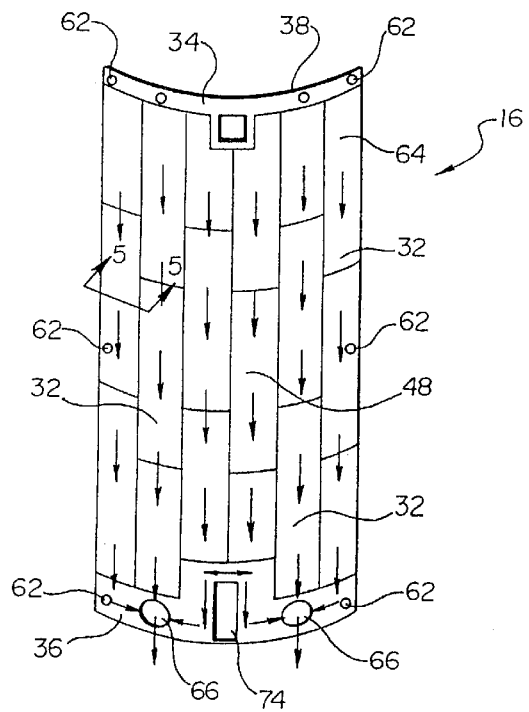
FIG. 3 is a perspective view of a section of a fairing of the invention showing the panels of honeycomb.
Figure 4:
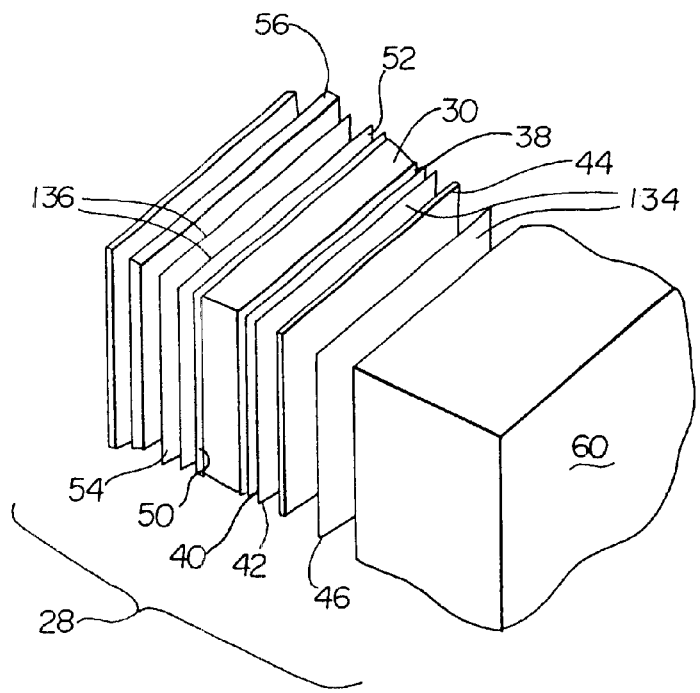
FIG. 4 is an exploded perspective view of a portion of the fairing of the invention.
Figure 5:
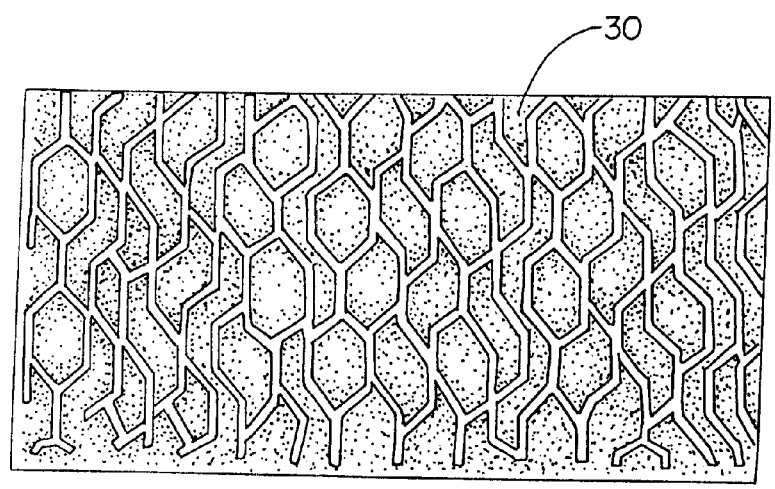
FIG. 5 is a cross section of a panel of two dimensional honeycomb material taken along the line 5—5 of FIG. 3.

The fairing will now be described in more detail starting with the core material utilized in the invention. Referring now to FIG. 4, a partial section of the fairing wall 28 is shown in an exploded perspective view. The fairing wall utilizes a modified honeycomb core 30 in section 16 which makes up the cylindrical portion 15 of the shroud. In the preferred embodiment, the core 30 is a two-dimensional aluminum honeycomb manufactured by Alcore Inc. of Belcamp, Md. under the names TRUSSGRID and PLY-GRID. The modified honeycomb 30 is said to be two-dimensional because the core material sheets used in traditional honeycomb are rotated relative to each other in manufacture. The resulting cells are half hexagons rotated ±45° in alternate layers. This provides a complex path for travel of the liquid utilized with the invention and also provides increased wall strength. The complex pathways are shown in FIG. 5 which is a cross section of a panel 32 of the two-dimensional honeycomb material taken along the line 5—5 in FIG. 3.

The acoustic field at the outside surface of a fairing consists of alternate compression and rarefaction of the surrounding air at frequencies determined by noise sources such as the rocket plume at liftoff or turbulent air flow past the fairing during flight. Acoustic "transmission" takes place when alternate compression and rarefaction of the air (or other fluid) inside the fairing is induced by the acoustic field outside the fairing. There are three mechanisms for this coupling. One is membrane and/or bending deflections of the fairing wall due to the external acoustic pressure, the second is through-the-thickness compression and stretching of the fairing wall material and the third is air leakage through openings in the fairing wall. Leakage transmission can be reduced or eliminated by standard sealing techniques and are not addressed by this invention. In most situations, membrane or bending deflections are much larger than through-the-thickness motion and the latter can be neglected. The membrane or bending deflections can be reduced by (1) increasing the stiffness of the fairing wall, (2) increasing the mass per unit area of the wall or (3) fabricating the wall from materials that exhibit viscoelastic friction. This invention combines approaches (2) and (3).

Local exposure or exposure to high decibel energy in discrete areas is a problem for standard honeycomb structures. The viscoelastic losses of modified honeycomb dissipate local exposure more easily than materials which have been used in the past. Any appropriate two dimensional or modified honeycomb material may be utilized.

In the preferred embodiment, the core 30 utilized in section 16 is aluminum TRUSSGRID material and PLY-GRID material which is approximately 1.5 inches thick. Referring now to FIG. 3, the core 30 is comprised of a number of panels 32, 34, and 36 of core material for ease of construction in the preferred embodiment. The panels 32 are approximately four feet by eight feet and are preformed on a predetermined radius so that the desired curve of the section 16 is obtained. The panels 32 are made of aluminum TRUSSGRID material in the preferred embodiment. The panels may be of different sizes and curvatures, as appropriate. Also, any appropriate number of panels may be utilized as required to meet the specifications of a particular shroud. One of numerous possible arrangements of panels 32 is shown in FIG. 3. The panels are cut to form the desired shape and size. In the preferred embodiment shown in FIG. 3, an upper and lower panel 34 and 36 are also utilized with the panels 32. These panels 34 and 36 cooperatively fit with the lay out of panels 32 to provide the proper curvature, size and shape. In this embodiment, the panels 34 and 36 are made of two dimensional PLYGRID honeycomb material made by Alcore Inc. The TRUSSGRID and PLYGRID materials have different flow directions and therefore are used to obtain the desired flow characteristics. Like panels 32, the upper and lower panels 34 and 36 may be of any size and configuration as is desired. Panels 34 and 36 facilitate draining of the liquid jettisonable layer which will be discussed in more detail later in this description.

The nose cone and cap 18 and 20 also include core material. The core material 30 may be the modified honeycomb described above or may be a traditional honeycomb material. The geometry of the cone and cap make them stiff and resistant to flexure. There is sufficient geometric stiffness in these portions of the fairing to protect the payload from the acoustic forces. Therefore, it is acceptable to construct the nose cone and cap walls of varying core materials. These core materials would be determined by the specifications of the launch. In the preferred embodiment, the nose cone 18 is made up of sections 22 constructed from a core 30 which is a standard honeycomb material over expanded in one direction to allow easy forming of the material to the desired shape. The core 30 is 1.5 inches in thickness in a preferred embodiment of the nose cone. The nose cap portion 20 is made up of sections 24 made from core material 30. The core 30 utilized for the nose cap 20 is FLEX-CORE material which is a highly flexible honeycomb material made by Hexcel. The core 30 is 1.5 inches in thickness in section 24 in the preferred embodiment. It should be understood that the materials and thicknesses for the core of each of these portions 18 and 20 may vary depending on specifications as is well known in the art. Any appropriate honeycomb material may be utilized including a two dimensional honeycomb if desired. The core may be comprised of panels, pieces, or sheets of material of varying sizes as desired.

In the preferred embodiment, the inner skin 134 is constructed first. The inner skin 134 includes a face cloth 46 and load skin 42. The face cloth or face sheet 46 is placed on a mandrel. The face sheet is typically a carbon fiber weave with preimpregnated epoxy resin. The face sheet 46 is utilized to provide a sound structure and machinability to the wall 28. The cloth 46 has multiple fiber orientations. The multiple fiber orientation allows for better results when drilling holes, for example, as may be desired for attachment of a base ring or separation rings as is known to those skilled in the art. In a preferred embodiment the face sheet 46 is a carbon fiber/epoxy sheet which is 7.7 Mil thick and has a weight of 193 g/m$^2$. The epoxy is chosen from the group of epoxies that cure between 250° F. and 350° F. It should be understood that any appropriate fiber/resin weave may be utilized.

A moisture barrier 44 is installed and an inner load skin 42 is fiber placed over the moisture barrier 44. A water barrier 44 is placed next to the load skin 42 to keep moisture away from the payload. Moisture could damage the payload so the seal 44 is used to prevent the passage of condensation and moisture to the cavity where the payload resides. The water barrier is an impermeable rubber sheet known as Tedlar film in the preferred embodiment. The film is 10 Mil in thickness. However, any suitable material or thickness of material may be used which prevents the passage of moisture to the inside of the shroud 12. The moisture seal is placed between the face sheet 46 and the load skin 42 in the preferred embodiment so that possible damage to the barrier 44 is minimized. It should be understood that the barrier may be placed on the inner surface of the face sheet 46 if desired.

The load skin 42 is a strong load bearing layer to provide strength for the wall 28. In the preferred embodiment, the load skin is a carbon tape impregnated with epoxy resin with a thickness of 7.2 Mil/ply. The resin utilized in the preferred embodiment is an epoxy resin chosen from the group of epoxies which cures between 250° F. and 350° F. It should be understood that other appropriate resins may be used. Four plies of the carbon tape 42 are used and each ply has a weight of 190 g/m$^2$. The load skin 42 may also be applied by other known means and sheets may also be used rather than tape. The thickness and number of layers of the material will also vary depending on the specifications of the shroud to be constructed.

In the preferred embodiment a layer of adhesive film 40 is laid down on the inner load skin surface 42. The adhesive is 8/13 Mil in thickness and cures at 350° F. The adhesive is FM300 made by American Cyanimide in the preferred embodiment although any other suitable adhesive may be used.

The core 30 is then installed over the adhesive film 40. The core 30 has an inner or concave surface 38. The core 30 is installed such that the inner surface 38 of the core 30 is applied to the adhesive film 40. In this manner, the core material 30 is bonded to the inner load skin 42 when the adhesive film 40 is cured.

The outer layers of the wall 28 of the section 16 will now be described. The outer layers are those layers that are connected to the outer surface 48 of the core 30. The outer surface 48 of the core 30 is the convex side of the core 30. A second adhesive film 50 is applied to the outer surface 48 of the core 30. The adhesive film is a 8/13 Mil thick adhesive which cures at 350° F. Any appropriate film adhesive may be used. In the preferred embodiment, FM300 or equivalent film adhesive is used.

The outer skin 136 is connected to the outer surface of the core. The outer skin 136 includes a second load skin 52 and a second face cloth 54. The second load skin 52 is fiber placed over the adhesive film 50. In the preferred embodiment, this second load skin 52 is the same as load skin 42 described above. The load skin 52 is a carbon fiber/epoxy impregnated tape with a thickness of 7.2 Mil/ply. Four plies are used and each ply has a weight of 190 g/m$^2$. Like the load skin 42, this load skin 52 carries the load of the shroud 12.

A second face sheet 54 is then bonded to the load skin 52. The face cloth 54 is carbon fabric impregnated with resin in the preferred embodiment and is 7.7 Mil in thickness with a weight of 193 g/m$^2$. The face sheet 54 provides structure and machinability to the exterior surface of the shroud 12. The face sheet is laid up on the load skin 52 in the preferred embodiment but other methods may be used. In the preferred embodiment the first and second load skins and face sheets are the same so that there is symmetry of the layers. In this manner, the layers respond to curing in the same way which provides for a better structure. However, it should be understood that whether the layers are different or the same, a variety of materials and specifications of materials may be used for the inner and outer skins 134 and 136, as desired and appropriate as is understood by those skilled in this area.

The wall 28 of the structure must be cured. Curing may take place by any appropriate method. Generally, it is desired to cure the structure in an autoclave. The mandrel is transferred to an autoclave for the curing process which is well known in the art. It is also possible to place a vacuum bag around the entire structure, create a vacuum and cure the structure in an oven. After cure is completed the structure may be cut into the desired number of sections if it was made as a whole as described earlier in the description.

The sectors 13 are then machined as appropriate and the drain devices for draining of the jettisonable liquid are installed. The cylindrical portion 16 of the fairing includes a plurality of vent holes or apertures 62 and drain ports 66 as shown in FIG. 3.

The apertures 62 and drain ports 66 are machined into the cured fairing wall and vent to the outside of the fairing section 16. The vent apertures 62 allow for venting of air which is displaced by liquid when the core material layer 30 is filled with a liquid for the liquid suppression layer 64 before liftoff and which displaces liquid when the liquid is jettisoned after liftoff. In the preferred embodiment, vent holes 62 are located in panel 34, in some of the panels 32 and in panel 36. Of course, the number and placement of vent apertures may vary as desired and appropriate.

Figure 6A:
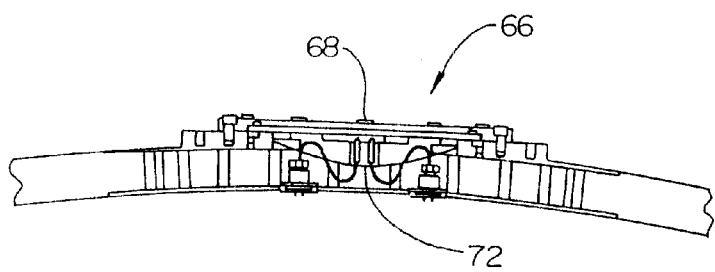
FIG. 6a is a cross-sectional view of a fairing wall and drain port.
Figure 6B:
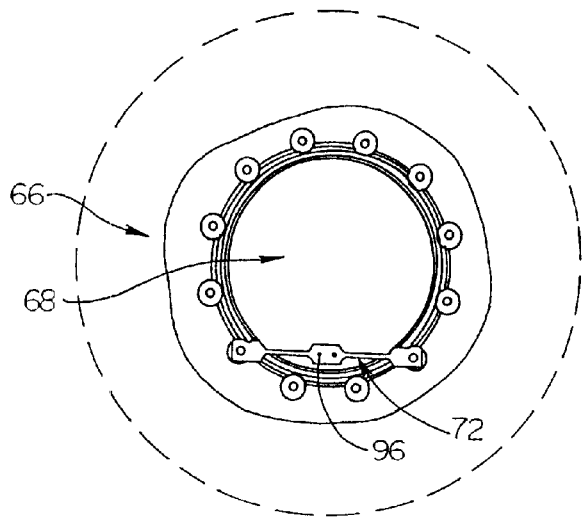
FIG. 6b is a top down view of a drain port and cover.
Figure 6C:
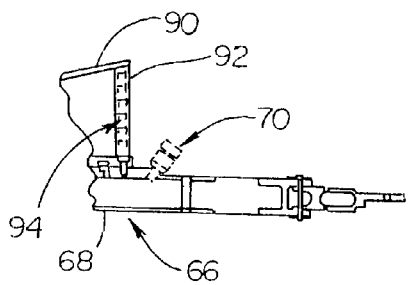
FIG. 6c is a cross sectional cut-away view of the drain port cover and cowling.
Figure 6D:
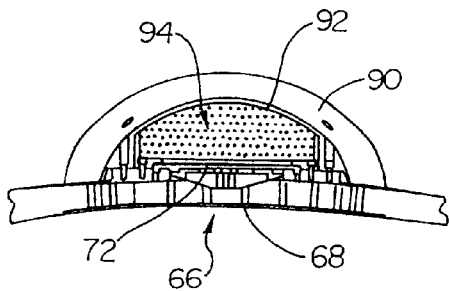
FIG. 6d is an additional view of the drain port shown in FIG. 6a shown with a drain cowling in place.
Figure 8:
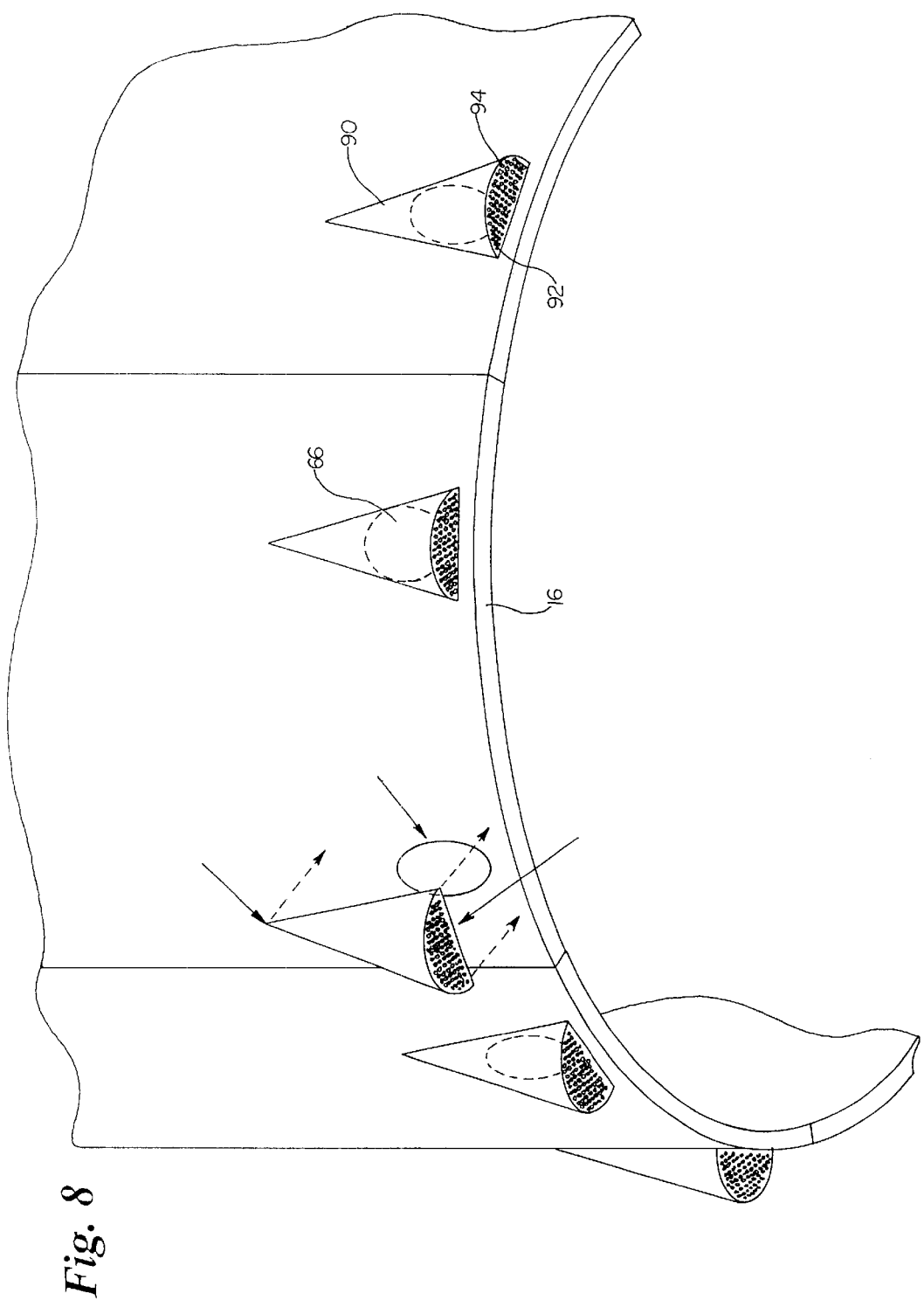
FIG. 8 is a perspective view of the inventive fairing wherein each drain port is covered by a cowling.

Referring now to FIGS. 3 and 6a–d, drain ports 66 are machined into the bottom panel 36 to allow for draining of the liquid suppression layer 64. The ports 66 are generally circular although other shapes may be utilized. The ports 66 are machined into the fairing wall 28. The ports are of an appropriate size to accommodate quick draining of the liquid suppression layer 64. Covers 68 are sized and configured to cover the drain ports 66. The covers 68 are made of frangible glass in the preferred embodiment and are sealed such that liquid may be held in the core material. The drain port assemblies include a fracturing mechanism 72 which fractures the glass so liquid may drain out. The fracturing mechanism 72 is a fracturing point which is remotely triggered by pneumatic, electronic or energetic means. Preferably, the fracturing mechanism 72 is one or more metal studs 96 which explosively strike the glass cover 68. As shown in FIGS. 6c, 6d, and 8, the drain ports 66 will preferably be covered by a semi-conical cowling 90 and are thus not normally visible from the outside of the fairing panel. The cowling 90 includes an atomization plate 92. To prevent interference with other functions of the rocket (e.g., radio communication), the holes 94 of the atomization plate 92 break up the jettisoned fluid into a fine spray.

Figure 7A:
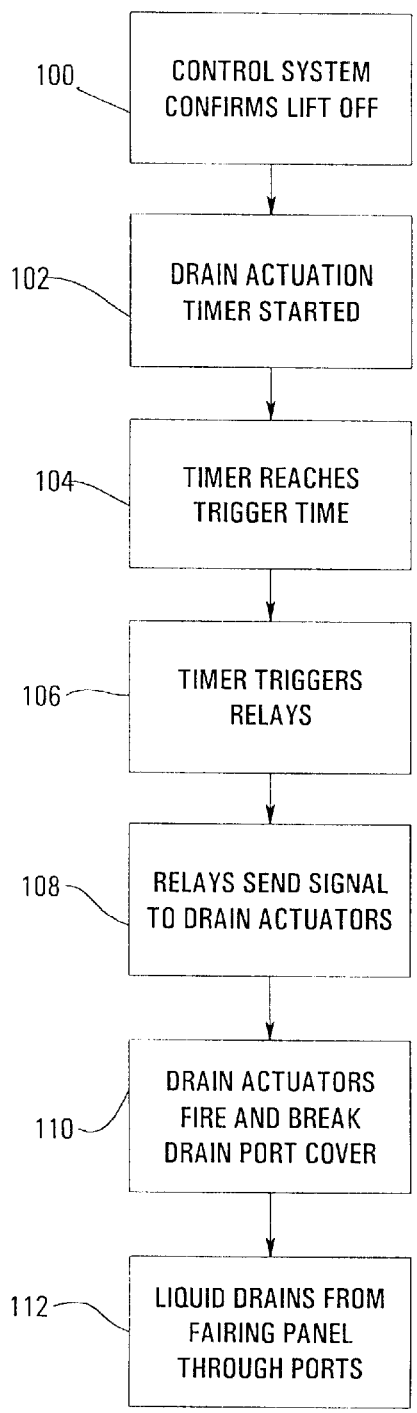
FIG. 7a is a block diagram illustrating a first embodiment of the various steps which lead to initiation of the drain event.
Figure 7B:
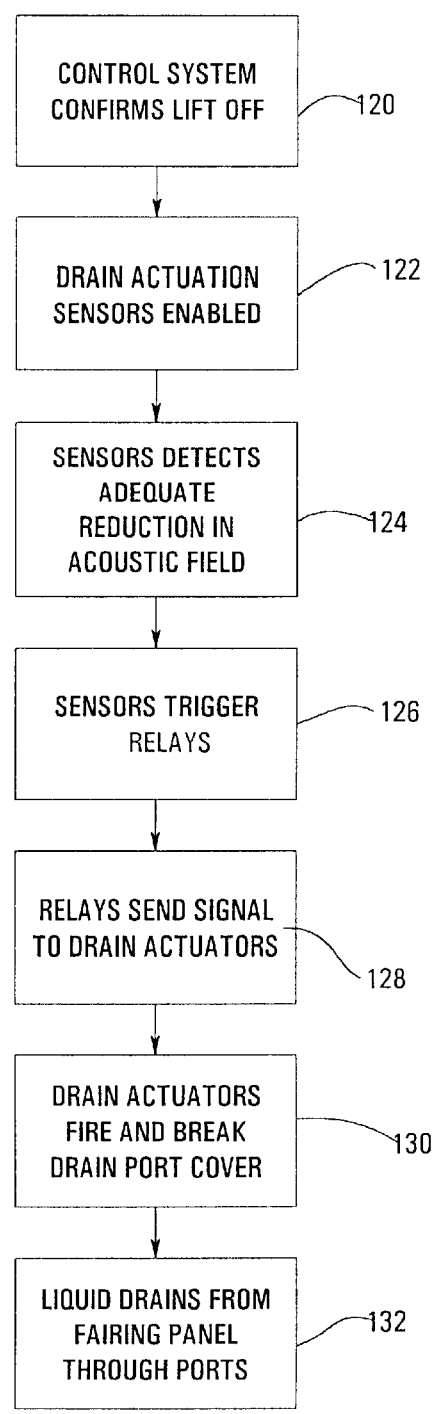
FIG. 7b is a block diagram illustrating a second embodiment of the various steps which lead to initiation of the drain event.

Two alternative control mechanisms and the respective steps which take place in order to trigger the fracturing mechanism 72 are depicted by the block diagrams of FIGS. 7a and 7b. In block 100 of FIG. 7a the control system of the rocket confirms that the rocket has achieved lift off. In Block 102 the control system signals a drain actuation timer to begin a count down. The count down timer may be programmed to count down a predetermined amount of time. Typically, the detrimental vibrations associated with excess acoustic energy have sufficiently subsided after approximately 5 seconds from launch. Blocks 104 and 106 indicates that once the timer counts down 5 seconds or to some other predetermined amount of time, the timer sends out an electric signal which triggers one or more relays. Then, as shown in block 108, the relays send signals to the drain actuators or fracturing mechanism 72. In block 110, the fracturing mechanism 72 shatters the glass of the cover 68 by forcing the metal studs 96 explosively into the glass. Alternative methods for shattering the glass are well understood in the art and could include other explosive and/or striking mechanisms. Once the drain port covers 68 are shattered the liquid drains from the fairing panel through the ports as indicated in the final block 112.

FIG. 7b shows an alternative series of steps wherein the timer of FIG. 7a is replaced with an acoustic sensor. As indicated in block 122, the acoustic sensor is activated upon lift off. As shown by blocks 124 and 126, the acoustic sensor detects the level of acoustic energy present within the fairing and then signals the relays to trigger the fracturing device as shown when a sufficient reduction in acoustic energy is detected. The relays then signal the drain actuators or fracturing mechanism to fire as indicated by block 128. Blocks 130 and 132 indicate that the drain port cover is shattered and the fluid is released.

As may be seen in FIG. 3, in a preferred embodiment of the invention, a door aperture or access plate 74 is also cut into the bottom panel 36 in the preferred embodiment. A door (not shown) may then be installed so that when the fairing is complete there is access to the inner cavity. Access may be desired for a number of reasons known to those skilled in the art.

In the preferred embodiment, after the drain mechanism is installed, the sectors 13 are prepared for connection and then are connected by the appropriate separation devices such as an energetic separation joint described above. Appropriate attachment rings or devices are also connected so the fairing may be connected to the launch vehicle.

The shroud 12 must be able to withstand the high temperatures that accompany vehicle launch and flight. Therefore, a thermal ablative layer or thermal protection layer 56 is utilized. This thermal protection layer 56 is cork in the preferred embodiment and is 10 Mil thick. Any known thermal protection material may be used such as spray on ablative materials common to launch vehicles. The thermal layer 56 is bonded to the second face sheet 54. A room temperature or oven cure epoxy may be utilized to connect the thermal layer 56 to the second face sheet 54.

It is also known that an electrostatic charge can be generated during the flight of a launch vehicle. Therefore, it is necessary to dissipate this charge. A charge dissipation layer 58 is bonded to the thermal protection layer 56. The charge dissipation layer or environmental seal 58 is a layer of conductive paint in the preferred embodiment and is 10 Mil in thickness. This environmental seal 58 also helps to protect the shroud 12 from other environmental effects such as rain, snow or other conditions which could be harmful to the shroud. The paint 58 is a MI-15 Environmental Seal paint made by Lockheed-Martin in the preferred embodiment but any suitable paint may be used. The paint 58 is the outer most layer of the shroud 12. The shroud 12 may also utilize acoustic blankets 60 to further dampen the acoustic energy which is generated during launch. The blankets 60 are generally made of fiberglass in plastic bags. A foam which is a poly material, sometimes referred to as an acoustic foam, may also be used. Any suitable material may be used as is well known to those skilled in the art. The thickness of the blankets 60 depends on the specifications of the launch. In a preferred embodiment, the thickness of the acoustic foam is four (4) inches and the weight of the foam is 2.0 lb/ft$^3$. The thickness of the blankets may vary considerably. Also, blankets 80 may not be necessary for every launch. The blankets 80 are connected to the wall 28 of the shroud 12 by conventional means such as film adhesive. Other fastening means may be utilized such as tie straps.

The blankets 80 would generally be utilized with the cylindrical portion 15 of the shroud 12. The nose cone 18 and cap 20 portions would usually not require the use of blankets 80 although they could be used as desired. The nose cone and nose cap portions 18 and 20 tend to have enough stiffness to protect the payload from the acoustic forces generated during flight. The geometry of the cone makes it stiff and therefore resistant to flexure. The geometric stiffness provides the benefit of resistance to the acoustic energy.

The liquid suppression layer 64 is added to the fairing wall 28 when the fairing is connected and the payload is in place. The fill valves 70 are used to fill or empty liquid from the faring as required by pre-launch operations. The liquid is water in the preferred embodiment although a number of different liquids may be utilized. Other examples include mercury, antifreeze, oil and other liquids. The liquid layer 64 is shown in FIG. 3 and the volume of liquid used may be varied as desired. In the preferred embodiment the cylindrical portion 15 is filled. The cylindrical portion is filled because that is the area of the fairing where the acoustic energy is most easily transmitted. The core material layer 30 is filled from the bottom up in the preferred embodiment to eliminate air pockets. One or more vent holes 62 or fill valves 70 are used to fill the fairing wall. The liquid is added through the hole or holes, or valve or valves.

The mass addition of the liquid layer in conjunction with the two dimensional honeycomb material serve to suppress the noise created during launch of the payload. The liquid layer 64 is generally required during the initial twenty seconds of the flight when the acoustic levels are the highest. Once the lift-off event is completed the liquid is dumped overboard. The drain ports are opened and the liquid is drained quickly. Because the draining takes place early in the launch and because it is done quickly, the impact on vehicle lift capability is small. After the liquid is drained the fairing wall including the modified honeycomb material provides adequate acoustic suppression needed to protect the payload.

It should be understood that the order of the construction of the fairing described above is exemplary only and that any other order or method or materials of construction is contemplated with this invention.

The above Examples and disclosure are intended to be illustrative and not exhaustive. This description is an exemplification of the principles of the invention and is not intended to limit the invention to the particular embodiments illustrated. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A payload fairing wall for use with a fairing for a launch vehicle, the fairing wall comprising:
   (a) an inner skin having an inside surface and an outside surface;
   (b) a modified honeycomb layer having an inside surface and an outside surface, the inside surface of the modified honeycomb layer connected to the outside surface of the inner skin;
   (c) an outer skin having an inside surface and an outside surface, the inside surface of the outer skin connected to the outside surface of the modified honeycomb layer; and
   (d) a liquid held within the modified honeycomb layer.

2. The fairing wall of claim 1 further comprising a thermal protection layer connected to the outside surface of the outer skin.

3. The fairing wall of claim 2 further comprising an environmental seal connected to the thermal protection layer.

4. The fairing wall of claim 3 wherein the environmental seal is conductive paint.

5. The fairing wall of claim 1 wherein the modified honeycomb layer is aluminum.

6. The fairing wall of claim 1 further comprising an acoustic blanket connected to the inside surface of the inner skin.

7. The fairing wall of claim 1 wherein the inner skin comprises a first face sheet of carbon fiber/epoxy fabric connected to a first load skin layer of carbon fiber/epoxy tape.

8. The fairing wall of claim 1 wherein the modified honeycomb layer is TRUSSGRID material.

9. The fairing wall of claim 1 wherein the outer skin comprises a second face sheet of carbon fiber/epoxy fabric connected to a second load skin layer of carbon fiber/epoxy tape.

10. The fairing wall of claim 1 wherein the liquid is water.

11. A payload fairing wall for use with a fairing for a launch vehicle, the fairing wall comprising:
   (a) a first face sheet having an inside surface and an outside surface;
   (b) a first load skin layer having an inside surface and an outside surface, the outside surface of the first load skin connected to the inside surface of the first face sheet;
   (c) a modified honeycomb layer having an inside surface and an outside surface, the outside surface of the modified honeycomb layer connected to the inside surface of the first load skin layer;
   (d) a second load skin layer having an inside surface and an outside surface, the outside surface of the second load skin connected to the inside surface of the modified honeycomb layer;
   (e) a water barrier layer having an inside surface and an outside surface, the outside surface of the water barrier layer connected to the inside surface of the second load skin;
   (f) a second face sheet having an inside surface and an outside surface, the outside surface of the second face sheet connected to the inside surface of the water barrier layer; and
   (g) a liquid held within the modified honeycomb material.

12. The fairing wall of claim 11 further comprising a thermal protection layer connected to the outside surface of the first face sheet.

13. The fairing wall of claim 12 further comprising an environmental seal connected to the thermal protection layer.

14. The fairing wall of claim 13 wherein the environmental seal is conductive paint.

15. The fairing wall of claim 11 wherein the modified honeycomb layer is aluminum.

16. The fairing wall of claim 11 further comprising an acoustic blanket connected to the inside surface of the second face sheet.

17. The fairing wall of claim 11 wherein the first face sheet is carbon fiber fabric impregnated with epoxy resin.

18. The fairing wall of claim 11 wherein the first load skin layer is carbon fiber tape impregnated with epoxy resin.

19. The fairing wall of claim 11 wherein the modified honeycomb layer is TRUSSGRID material.

20. The fairing wall of claim 11 wherein the second face sheet is carbon fiber fabric impregnated with epoxy resin.

21. The fairing wall of claim 11 wherein the second load skin layer is carbon fiber tape impregnated with epoxy resin.

22. The fairing wall of claim 11 wherein the liquid is water.

23. A payload fairing for use with a launch vehicle, comprising:
   (a) a base portion having a wall comprising:
      (i) a first face sheet having an inside surface and an outside surface and made of carbon fiber/epoxy fabric;
      (ii) a first load skin layer having an inside surface and an outside surface and made of carbon fiber/epoxy tape, the outside surface of the first load skin connected to the inside surface of the first face sheet;
      (iii) a modified honeycomb layer having an inside surface and an outside surface, the outside surface of the modified honeycomb layer connected to the inside surface of the first load skin layer, the modified honeycomb layer including a liquid;
      (iv) a second load skin layer having an inside surface and an outside surface and made of carbon fiber/epoxy tape, the outside surface of the second load skin connected to the inside surface of the modified honeycomb layer;
      (v) a water barrier layer having an inside surface and an outside surface, the outside surface of the water barrier layer connected to the inside surface of the second load skin; and
      (vi) a second face sheet having an inside surface and an outside surface and made of carbon fiber/epoxy fabric, the outside surface of the second face sheet connected to the inside surface of the water barrier layer;
   (b) a nose cone portion connected to the base portion; and
   (c) a nose cap portion connected to the nose cone portion.

24. The base portion of claim 23 further comprising a drain mechanism for draining the liquid from the modified honeycomb material at a predetermined point in the launch.

25. The base portion of claim 23 further comprising a thermal protection layer connected to the outside surface of the first face sheet.

26. The base portion wall of claim 25 further comprising an environmental seal connected to the thermal protection layer.

27. The base portion wall of claim 26 wherein the environmental seal is conductive paint.

28. The base portion wall of claim 23 wherein the modified honeycomb layer is aluminum.

29. The base portion wall of claim 23 further comprising an acoustic blanket connected to the inside surface of the second face sheet.

30. The base portion wall of claim 23 wherein the honeycomb layer is TRUSSGRID material.

31. The base portion wall of claim 23 wherein the water barrier layer is rubber.

32. The base portion wall of claim 23 wherein the liquid is water.

33. A shroud for use with a launch vehicle, the shroud comprising:
- (a) a base portion having a wall, comprising:
  - (i) a first face sheet having an inside surface and an outside surface;
  - (ii) a first load skin layer having an inside surface and an outside surface, the outside surface of the first load skin connected to the inside surface of the first face sheet;
  - (iii) a modified honeycomb layer having an inside surface and an outside surface, the outside surface of the modified honeycomb layer connected to the inside surface of the first load skin layer, the modified honeycomb layer including a liquid;
  - (iv) a second load skin layer having an inside surface and an outside surface, the outside surface of the second load skin connected to the inside surface of the modified honeycomb layer;
  - (v) a water barrier layer having an inside surface and an outside surface, the outside surface of the water barrier layer connected to the inside surface of the second load skin; and
  - (vi) a second face sheet having an inside surface and an outside surface, the outside surface of the second face sheet connected to the inside surface of the water barrier layer;
- (b) a nose cone portion connected to the base portion, the nose cone portion having a wall comprising:
  - (i) a first face sheet having an inside surface and an outside surface;
  - (ii) a first load skin layer having an inside surface and an outside surface, the outside surface of the first load skin connected to the inside surface of the first face sheet;
  - (iii) a honeycomb layer having an inside surface and an outside surface, the outside surface of the honeycomb layer connected to the inside surface of the first load skin layer;
  - (iv) a second load skin layer having an inside surface and an outside surface, the outside surface of the second load skin connected the inside surface of the honeycomb layer;
  - (v) a water barrier layer having an inside surface and an outside surface, the outside surface of the water barrier layer connected to the inside surface of the second load skin; and
  - (vi) a second face sheet having an inside surface and an outside surface, the outside surface of the second face sheet connected to the inside surface of the water barrier layer; and
- (c) a nose cap portion connected to the nose cone portion, the nose cap portion having a wall comprising:
  - (i) a first face sheet having an inside surface and an outside surface;
  - (ii) a first load skin layer having an inside surface and an outside surface, the outside surface of the first load skin connected to the inside surface of the first face sheet;
  - (iii) a honeycomb layer having an inside surface and an outside surface, the outside surface of the honeycomb layer connected to the inside surface of the first load skin layer;
  - (iv) a second load skin layer having an inside surface and an outside surface, the outside surface of the second load skin connected to the inside surface of the honeycomb layer;
  - (v) a water barrier layer having an inside surface and an outside surface, the outside surface of the water barrier layer connected to the inside surface of the second load skin; and
  - (vi) a second face sheet having an inside surface and an outside surface, the outside surface of the second face sheet connected to the inside surface of the water barrier layer.

34. A payload fairing wall for use with a fairing for a launch vehicle, the fairing wall comprising:
- (a) an inner skin having an inside surface and an outside surface;
- (b) a porous core material having an inside surface and an outside surface, the inside surface of the porous core material connected to the outside surface of the inner skin;
- (c) an outer skin having an inside surface and an outside surface, the inside surface of the outer skin connected to the outside surface of the porous core material; and
- (d) a liquid held within the porous core material.

35. The fairing wall of claim 34 wherein the porous core material comprises a modified honeycomb layer.

36. The fairing wall of claim 35 wherein the modified honeycomb layer is aluminum.

37. The fairing wall of claim 34 wherein the modified honeycomb layer is TRUSSGRID material.

38. The fairing wall of claim 34 further comprising a thermal protection layer connected to the outside surface of the outer skin.

39. The fairing wall of claim 38 further comprising an environmental seal connected to the thermal protection layer.

40. The fairing wall of claim 39 wherein the environmental seal is conductive paint.

41. The fairing wall of claim 34 further comprising an acoustic blanket connected to the inside surface of the inner skin.

42. The fairing wall of claim 34 wherein the inner skin comprises a first face sheet of carbon fiber/epoxy fabric connected to a first load skin layer of carbon fiber/epoxy tape.

43. The fairing wall of claim 34 wherein the outer skin comprises a second face sheet of carbon fiber/epoxy fabric connected to a second load skin layer of carbon fiber/epoxy tape.

44. The fairing wall of claim 34 wherein the liquid is water.

* * * * *